Jan. 29, 1929.

O. D. DIBBERN 1,700,285

TANK HEATER

Filed Feb. 17, 1927

Inventor
Otto D. Dibbern
By Lynn H. Latta
Attorney

Patented Jan. 29, 1929.

1,700,285

UNITED STATES PATENT OFFICE.

OTTO D. DIBBERN, OF GALVA, IOWA.

TANK HEATER.

Application filed February 17, 1927. Serial No. 169,055.

My invention relates to tank heaters, particularly of the type which is adapted to be submerged in the ordinary stock watering tank and to be removable therefrom when not needed for heating the water in the tank.

An object of my invention is to provide such a heater of the utmost simplicity of construction.

Another object of the invention is to provide a heater which is adapted with a minimum amount of fuel to heat two separate regions in the body of water.

Another object of the invention is to provide a heater of simple construction enabling the ready withdrawal and replacement of the heating unit.

Another object of the invention is to provide a heater adapted to obtain the maximum heating effect from the heating element.

With these and other objects in view, my invention consists in the construction, arrangement and combination of the various parts of my device, whereby the objects contemplated are attained, as hereinafter more fully set forth, pointed out in my claim, and illustrated in the accompanying drawings, in which:

Figures 1, 2, 3:
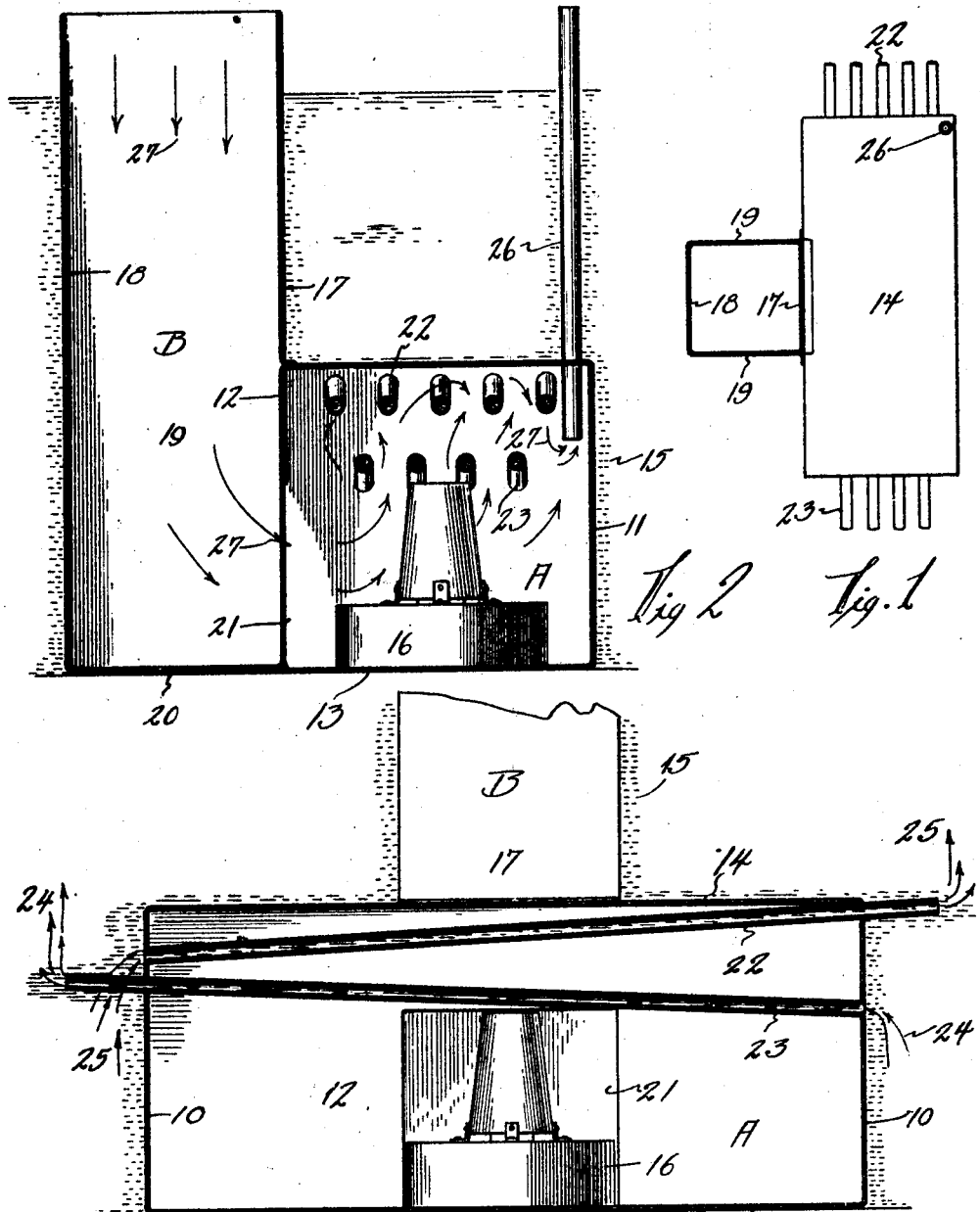
Fig. 1 is a plan view of the heater.
Fig. 2 is a transverse, central, sectional view of the heater immersed in a body of water.
Fig. 3 is a longitudinal, central, sectional view of the same.

The heater of my invention embodies generally a heating chamber adapted to be immersed in a body of water, a heating unit such as a kerosene lamp or the like and air flues to provide a circulation of oxygen for the lamp and adapted to reach above the body of water.

There are several problems connected with the successful operation of such a heater. Primarily, it is desirable, of course, to obtain the maximum amount of heating effect from the heating unit. In many of the heaters now on the market, an attempt is made to heat the entire body of water within the tank.

It is unnecessary ordinarily to heat the entire body of water in the tank and to do so is therefore a waste of fuel. Ordinarily, however, it is desirable to heat the water surrounding the float and also to heat a clear area from which the stock may drink.

My invention contemplates a heater which is so constructed as to heat two separated areas in the body of water and to obtain the maximum heating effect from the heating unit in doing so. To this end I provide an elongated chamber having the end walls 10, the side walls 11 and 12, the bottom 13 and the top 14. The chamber A is adapted to be immersed completely in a body of water as indicated at 15 and to be supplied with heat from a lamp or heating unit 16. The lamp 16 must be frequently removed for the replenishing of its fuel supply and in order that this may be easily accomplished and for the further purpose of supplying fresh air for the combustion of the fuel, I provide a flue B. The flue has the forward wall 17, rear wall 18, side walls 19 and a bottom 20 which may be formed as a continuation of the bottom 13 and which is preferably positioned in the same plane with the bottom 13. The wall 17 is cut away to leave a space equal in height to the height of the chamber A and the flue is secured to the wall 12 of the chamber in any suitable way as by soldering or brazing or the like. The wall 12 of the chamber is provided with an opening 21 which provides communication between the chamber and the flue and which is substantially the same width as the flue. The opening 21 extends from the bottom of the chamber to a point intermediate the bottom and the top thereof, thereby leaving a portion of the wall 12 partially closing the opening in the wall 17 and forming a dead air space in the upper region of the chamber. This dead air space is important in obtaining the maximum heating effect from the lamp 16 as will later be shown.

A considerable amount of heated gases from the lamp 16 will pass upward and be trapped within the dead air space just referred to and will thereby heat the walls of the chamber A so as to conduct heat into the body of water. However, this method of conducting away the heat from the heater will not produce the desired effect of concentrating the heat in two spots in a body of water and I therefore provide a plurality of water tubes occupying the space above the upper extremity of the opening 21. An upper series of tubes 22 is positioned in a plane extending upwardly from one end of the chamber A to the other end; a lower series of tubes 23 is positioned in a plane inclined upwardly from the latter mentioned end to the first mentioned end. The tubes 23 are staggered relative to the tubes 22, in order that the currents of heated gases may more readily flow upwardly so as to deliver the most heat to the tubes.

It will now be seen that the water standing in the tubes 22 and 23 will flow in the direction indicated by the arrows 24 and 25 respectively. Currents will be created flowing in both directions from either end of the chamber, the heated water from the centers of the tubes tending to rise and thereby to flow to the higher ends thereof.

The tubes 23 are extended beyond the end of the chamber A at their higher ends and beyond the ends of the tubes 22 which terminate in the end of the chamber. The purpose of so extending the tubes 23 is to prevent the heated water, flowing from the ends of these tubes, being drawn back into the adjacent ends of the tubes 22 and thereby defeating the object of providing an ascending current of heated water at each end of the heater. The higher ends of the tubes 22 are also shown extending beyond the end wall of the chamber, thus making the tubes 22 and 23 of the same length. It will be understood, however, that it is not essential to the proper functioning of the heater that the tubes 22 be extended.

The opening 21 is of sufficient height to allow the passage of the lamp 16 and the flue 17 is of sufficient diameter to allow the lamp to be lifted vertically without disturbing the heater. In removing or replacing the lamp, it is simply slid along the bottom 13 and the bottom 20 and lifted or lowered vertically in the flue B.

I provide a vent tube 26 for allowing escape of the gases from the chamber A and for creating a draft downwardly in the flue B. The tube 26 extends through the top wall 14 to which it is secured and downwardly into the dead air space in the upper portion of the chamber A so that the hottest gases will be retained at the top of the chamber and will not escape until after they have cooled somewhat. The lower end of the tube 26 is positioned above the opening 21, however, in order that the heated gases may escape through the vent tube more readily than through the flue B. Consequently the circulation of the gases will be as indicated by the arrows 27. Due to the arrangement of the water tubes 22 and 23 in the upper portion of the chamber which forms a dead air space, the heated gases are held for a sufficient length of time to give up a large portion of their heat to the water in the tubes and consequently the lamp 16 need supply only enough flame to keep the trapped gases in the dead air space at the proper temperature. The circulation of air and gases will therefore be comparatively slow and the small vent tube 26, although many times smaller in cross section than the flue B, will serve to release the spent gases and to create the desired circulation of fresh air to the lamp.

One end of the heater may be positioned under the float and the other end under the spot where it is desired to prevent the formation of a film of ice over the water. The circulation of the heated water from the ends of the tubes 22 and 23 being upwardly, it will be seen that it is only necessary to raise the temperature of the water which lies above the tubes and since it is only necessary to warm this portion of the water sufficiently to prevent freezing, it will be seen that the amount of heat which need be supplied will not be very great. In this connection, it will be noted that the bigger percentage of heat which is delivered from the heater is delivered at a plane which is very close to the top of the heater. The water below the discharge ends of the tubes is not heated to any considerable extent and since it is only necessary to heat the surface of the water in a tank, it will be seen that by placing the heater near enough to the surface so that the discharge ends of the tubes will be separated from the surface of the water by only a small body of water, that freezing will be adequately prevented without heating any considerable portion of the water in the tank. Since the heated water will remain at the top of the tank, the only escape of heat will be by conduction into the surrounding water and into the atmosphere. There will be no escape of heat from the heated areas by circulation of the water in the tank.

Some changes may be made in the construction and arrangement of the parts of my invention without departing from the real spirit and purpose of my invention, and it is my intention to cover by my claim, any modified forms of structure or use of mechanical equivalents, which may be reasonably included within their scope.

I claim as my invention:

In a tank heater, an inclosed, elongated heating chamber, a pair of series of water tubes extending from end to end of the chamber and communicating with the exterior thereof through the end walls, one series of tubes being inclined upwardly and toward one end of the chamber, the other series of tubes being inclined upwardly and toward the other end of the chamber, the higher ends of the lower series being extended substantially beyond the lower ends of the higher series to prevent the setting up of direct convection currents between the higher ends of the lower series of tubes and the lower ends of the higher series.

Signed this 12th day of February, 1927, in the county of Woodbury and State of Iowa.

OTTO D. DIBBERN.